(12) United States Patent
Sun et al.

(10) Patent No.: US 9,431,880 B2
(45) Date of Patent: Aug. 30, 2016

(54) DEVICE FOR MONITORING THE LIFETIME OF THE FAN BEARINGS

(71) Applicant: BEIJING AVC TECHNOLOGY RESEARCH CENTER CO., LTD., WaIndustry Dist., Chaoyag Dist., Beijing (CN)

(72) Inventors: Sung-Hsien Sun, Beijing (KR); Sung-Wei Sun, Beijing (KR)

(73) Assignee: BEIJING AVC TECHNOLOGY RESEARCH CENTER CO., LTD., Beijing (CN)

( * ) Notice: Subject to any disclaimer, the term of this patent is extended or adjusted under 35 U.S.C. 154(b) by 694 days.

(21) Appl. No.: 13/869,973

(22) Filed: Apr. 25, 2013

(65) Prior Publication Data

US 2014/0324385 A1   Oct. 30, 2014

(51) Int. Cl.
*G06F 11/30*    (2006.01)
*F04D 29/00*    (2006.01)
*F04D 29/04*    (2006.01)
*F04D 27/00*    (2006.01)
*F04D 29/059*   (2006.01)
*G01M 13/04*    (2006.01)

(52) U.S. Cl.
CPC ............. *H02K 11/25* (2016.01); *F04D 27/001* (2013.01); *F04D 27/008* (2013.01); *F04D 29/059* (2013.01); *G01M 13/04* (2013.01)

(58) Field of Classification Search
CPC .. F04D 27/008; F04D 27/001; F04D 29/059; F16C 19/525; G01M 13/04
USPC .......... 702/182–184; 310/40 R, 66, 90, 90.5; 416/61, 174
See application file for complete search history.

(56) References Cited

U.S. PATENT DOCUMENTS 7,315,100 B2 *  1/2008  Chen et al. .................. 310/90.5
8,419,364 B2 *  4/2013  Bouchard ...................... 416/61

* cited by examiner

*Primary Examiner* — An Do

(57) ABSTRACT

The present invention is a device for monitoring a lifetime of fan bearings, which is applied to a fan, comprising a base, at least one sensing unit, a processing unit, and a control plate. The base has a bearing sleeve receiving bearings. The sensing unit is selectively disposed on the bearing sleeve or on the bearing. The processing unit generates an informing signal based on comparison of a received temperature sensed signal generated by the sensing unit sensing the bearing temperature and an internal predetermined temperature value. By means of the device design of the present invention, the effects of effectively monitoring the bearings and predicting the remaining lifetime can be achieved.

10 Claims, 11 Drawing Sheets

DEVICE FOR MONITORING THE LIFETIME OF THE FAN BEARINGS

BACKGROUND OF THE INVENTION

1. Field of the Invention

The present invention relates to a device for monitoring a fan and in particular to a device having the effects of monitoring the status of bearings and predicting the remaining lifetime of the bearings, further achieving the effects of convenient operation and cost reduction.

2. Description of Prior Art

A cooling fan, a common heat dissipating structure, mainly provided in the electronic components, electric components, or machine generating heat, can be actuated to exhaust and dissipate the generated heat, fulfilling the purpose of cooling. Thus, the electronic, electric and mechanical components can be protected from high temperature which may cause damage or affect the operation to extend the lifetime thereof. Therefore, the cool fan is widespreadly installed in the currently common computer hosts, video recorders, and copiers.

The continuous operation of the cooling fan of prior art mainly relies on the relative movement of a bearing therein with respect to the axis of the cooling fan, so the bearing is one of the important key components which affect the quality of the cooling fan. Thus, the lifetime of the bearing is very important.

However, when the bearing of prior art is tested, it is installed in a bearing box of a bearing testing machine and is pivotally connected to the axis of the motor. Then, an accelerometer or a sensor of the same type is disposed on the bearing (or around the bearing) and is electrically connected to a digital signal processor (DSP). When the motor drives its axis, the bearing will move with respect to the axis. At this time, the vibration caused by the operating bearing is sensed by the accelerometer and a vibration signal is then generated. After that, the status of the bearing (e.g., the bearing is normal or abnormal) can be acquired by the analysis processing through the DSP based on the received vibration signal.

For the prior art, the status of the bearing can be obtained during the bearing testing, however, resulting in another problem. Due to the space limitation on the bearing testing machine, it is awkward for the accelerometer to be placed and also the cost of the accelerometer is considerable. Further, the use of DSP causes computational processing of great complexity.

The above prior art suffers the following disadvantages:
1. Limitation on installation in which the accelerometer is awkward to be placed; and
2. Cost is increased.

Therefore, how to overcome the above problems and disadvantages is the focus which the inventor and the related manufacturers in this industry have been devoting themselves to.

SUMMARY OF THE INVENTION

Thus, to effectively overcome the above problems, the primary objective of the present invention is to provide a device for monitoring a lifetime of fan bearings which can achieve the effects of monitoring the bearing status and predicting the remaining lifetime.

Another objective of the present invention is to provide a device for monitoring a lifetime of fan bearings which can achieve cost reduction and convenient operation.

To achieve the above objectives, the present invention provides a device for monitoring a lifetime of fan bearings, which comprises a base, at least one sensing unit, a processing unit, and a control plate, in which the base has a bearing sleeve having a bearing hole receiving a bearing having a shaft hole. The bearing sleeve protrudes from the center of the base. The above-mentioned sensing unit is electrically connected to the processing unit and selectively disposed on the bearing sleeve or on the bearing for sensing temperatures of the respective bearings to generate the respective temperature sensed signals which are sent to the processing unit. The processing unit generates an informing signal based on comparison of the received temperature sensed signals and an internal predetermined temperature value to inform the user of the status and lifetime of the bearings through the informing signal. By means of the device design of the present invention, the effects of effectively monitoring the bearings and predicting the remaining lifetime can be achieved. Further, cost reduction and convenient operation also can be fulfilled.

DETAILED DESCRIPTION OF THE INVENTION

The above objectives of the present invention and the features of structure and function of the present invention are described according to preferred embodiments in the accompanying figures.

Figure 1:
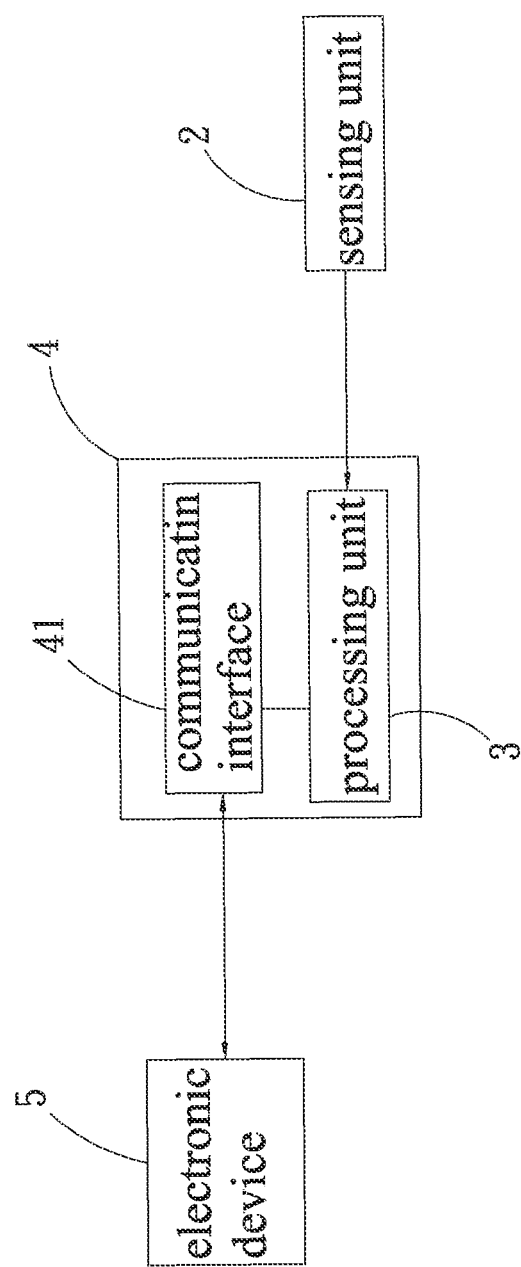
FIG. 1 is a block schematic of the electronic device and the monitoring device of the present invention.
Figure 2A:
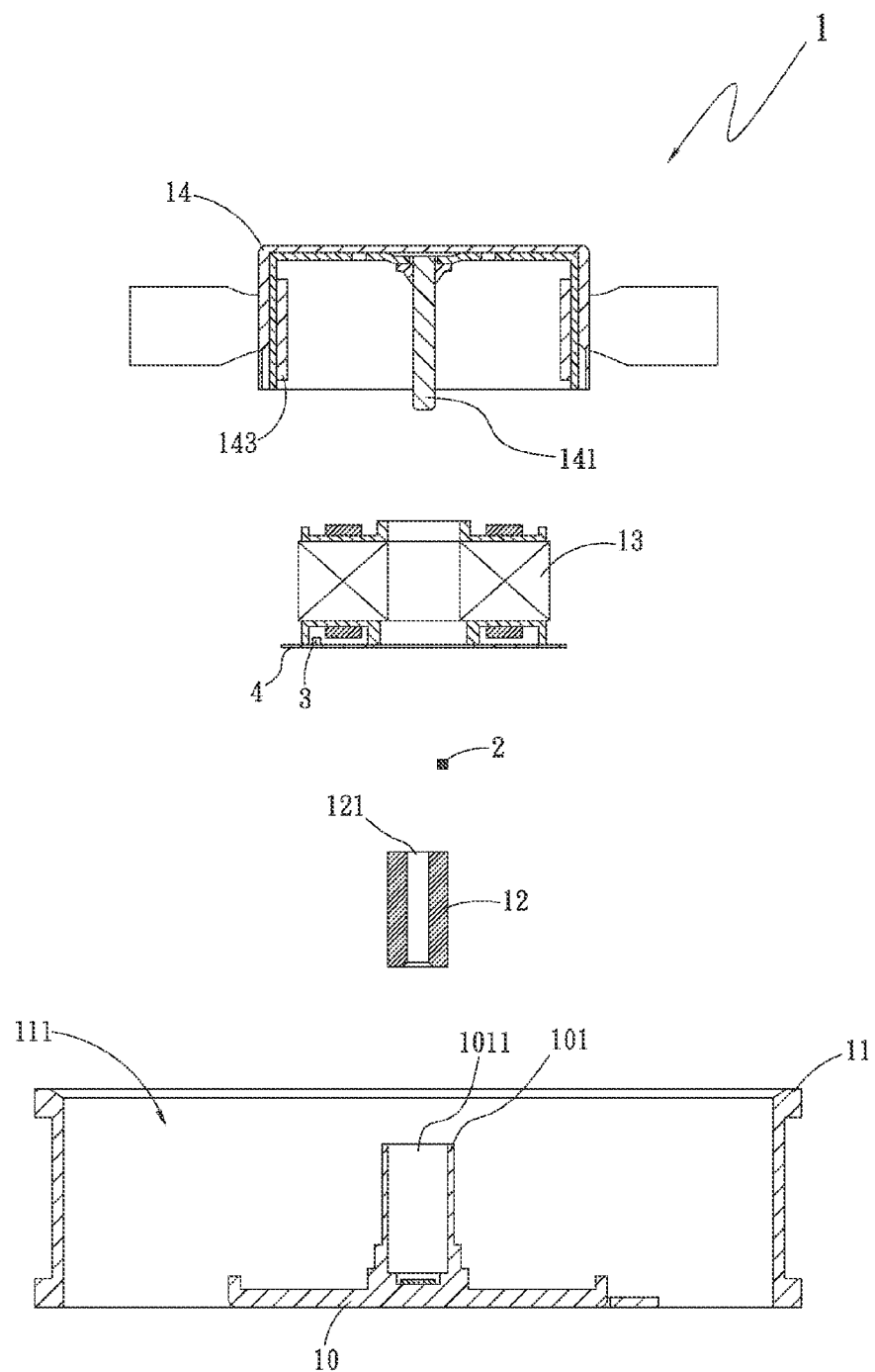
FIG. 2A is an exploded cross-sectional view according to the first preferred embodiment of the present invention.
Figure 2B:
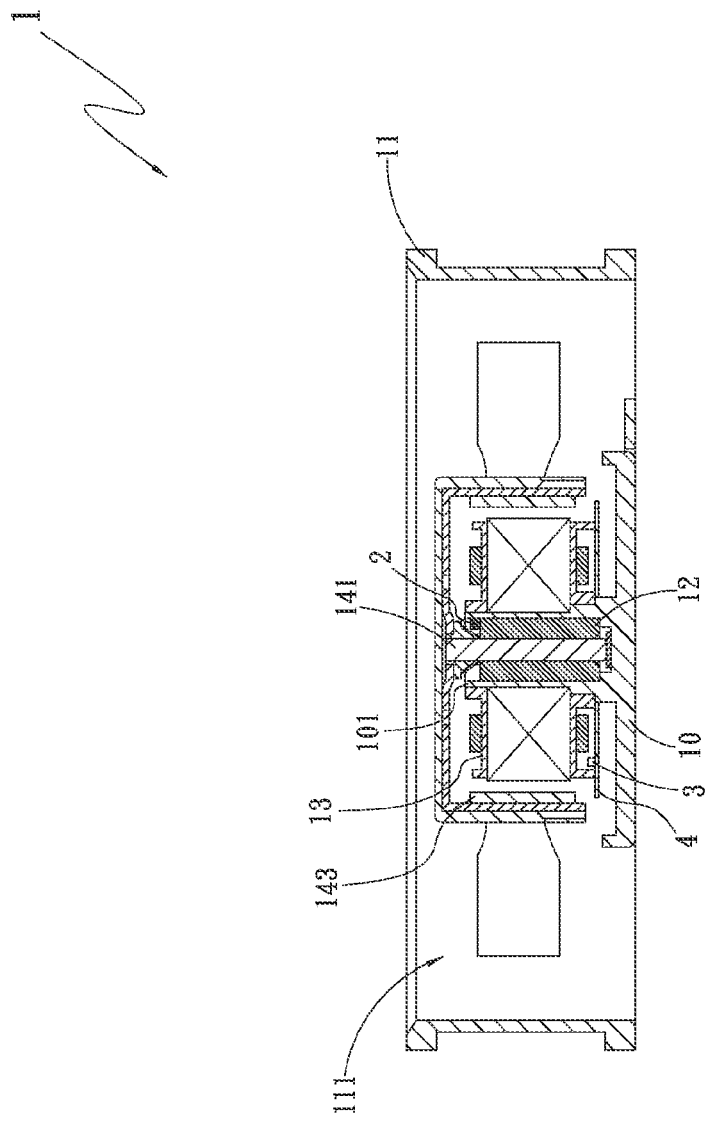
FIG. 2B is a combined cross-sectional view according to the first preferred embodiment of the present invention.

The present invention provides a device for monitoring a lifetime of fan bearings, referring to FIGS. 1, 2A, and 2B which are a block schematic, exploded cross-sectional and combined cross-sectional views according to the first embodiment of the present invention, respectively. The monitoring device is applied to a fan 1 which comprises a frame 11, a fan wheel 14, a base 10, and a silicon steel plate set 13. The frame 11 has an accommodating space 111 therein. The base 10 is disposed in the center of the accommodating space 111. The base 10 has a bearing sleeve 101 having a bearing hole 1011 having at least one bearing 12 having a shaft hole 121. The bearing sleeve 101 protrudes from the center of the base 10. The silicon steel plate set 13 is sleeved to the bearing sleeve 101.

The bearing sleeve 101 is pivoted to the fan wheel 14 having a shaft 14, in which one end of the shaft 14 is affixed to the fan wheel 14 and the other end thereof is rotatably disposed in the corresponding shaft hole 141. The fan wheel 14 covers the silicon steel plate set 13 such that a magnetic component 143 in the fan wheel 14 corresponds to the silicon steel plate set 13.

The above-mentioned monitoring device comprises the base 10, at least one sensing unit 2, a processing unit 3, and a control plate 4. The at least one sensing unit 2 is a temperature sensor which is selectively disposed on the bearing sleeve 101 or on the bearing 12. The sensing unit 2 in the preferred embodiment is selected to be disposed on the bearing 12 and a single bearing (e.g., a ball bearing, porous bearing, roller bearing, or ceramic bearing) is used as an example, but not limited to this. In practice, besides the above disposition, wherever in the fan 1 the temperature of the bearing 12 itself can be monitored can serve as the disposition of the sensing unit 2. The sensing unit 2 is used to sense (or monitor) the temperature of the corresponding bearing 12 to generate a temperature sensed signal. The temperature sensed signal is a really operating temperature value.

Also, the above-mentioned processing unit 3 is a microprocessor (MCU) which is electrically connected to the sensing unit 2 and generates an informing signal based on comparison of the received temperature sensed signal and an internal predetermined temperature value. That is, the processing unit 3 performs the comparison of the received temperature sensed signal and the internal predetermined temperature value in real time, and then substitutes the compared result into an equation of calculating the bearing lifetime. Finally, the informing signal which indicates if the bearing 12 is abnormal or predicts the lifetime (i.e., the remaining lifetime) of the bearing 12 is generated. For example, the temperature sensed signal received by the processing unit 3 is 70 degree which is then compared to the predetermined temperature value, 40 degree. After the compared result is substituted into the equation of calculating the bearing lifetime, the informing signal which indicates the bearing 12 is abnormal (e.g., the bearing temperature is abnormally higher than the predetermined temperature value) and predicts the remaining lifetime of the bearing 12 is generated.

The above-mentioned predetermined temperature value is a default temperature value or a factory-set temperature value. The above-mentioned informing signal comprises lifetime prediction information and abnormality information. The former is the information of prediction the remaining lifetime of the bearing 12; the latter is the information of damage, failure or higher bearing temperature than the predetermined temperature value regarding the bearing 12.

Moreover, the above-mentioned control plate 4 is a printed circuit board (PCB). The control plate 4 is disposed on the base 10. The control plate 4 in the preferred embodiment is disposed on one side of the base 10 opposite to the fan wheel 14 and adjacent to the bearing sleeve 101 for explanation, but not limited to this; the processing unit 3 is disposed on one side of the control plate 4 which is electrically connected to the processing unit 3 and the corresponding silicon steel plate set 13. Also, a communication interface 41 is provided on the control plate 4, in which the communication interface 41 is connected to an electronic device 5 (e.g., a computer, smart phone, notebook computer) such that the processing unit 3 transmits the informing signal to the electronic device 5 via the communication interface 41 and lets the user know the real-time information regarding lifetime prediction and abnormality.

In the preferred embodiment, the connection between the communication interface 41 and the electronic device 5 is wired (e.g., by a transmission line or signal line), but not limited to this. In the practice of the invention, the above-mentioned connected may be selected to be wireless connection (e.g., WIFI, 3G, 4G, or Bluetooth). In addition, in the practice of the invention, the electronic device 5 can update the predetermined temperature value in the processing unit 3 via the communication interface 41. For example, the original predetermined temperature value in the processing unit 3 can be changed from 40 degree to 35 degree.

Please refer to FIGS. 1, 2A, and 2B. When the fan 1 rotates, the sensing unit 2 monitors the temperature of the bearing 12 in real time and generates and transmits a temperature sensed signal to the processing unit 3 such that the processing unit 3 generates an informing signal based on comparison of the received temperature sensed signal and the internal predetermined temperature value, and then substitutes the compared result into the equation of calculating the bearing lifetime. Then the informing signal is transmitted to the electronic device 5 via the communication interface 41 such that the user knows the information if the bearing 12 is abnormal or about the lifetime prediction of the bearing 12 via the informing signal displayed by the electronic device 5.

At this time, if the bearing 12 in the fan 1 is damaged (e.g., abnormally increased temperature), the sensing unit 2 monitors (or senses) the temperature of the bearing 12 and generates a temperature sensed signal to the processing unit 3 such that the processing unit 3 performs the comparison of the received temperature sensed signal (e.g., 70 degree) and the internal predetermined temperature value (e.g., 40 degree), and then substitutes the compared result into the equation of calculating the bearing lifetime to generate the informing signal. Then, the informing signal is transmitted to the electronic device 5 via the communication interface 41 such that the user knows the abnormality information (i.e., the bearing temperature is abnormally higher than the predetermined temperature value) and the lifetime prediction information of the bearing 12 via the informing signal displayed by the electronic device 5. Therefore, the effects of monitoring the status of the bearing 12 and predicting the remaining lifetime of the bearing 12 can be effectively achieved.

Therefore, by means of the monitoring device of the present invention applied to the design of the fan 1, the effects of effectively monitoring the status of the bearing 12 and predicting the remaining lifetime of the bearing 12 in real time can be achieved. Further, cost reduction and convenient operation also can be fulfilled.

Figure 3A:
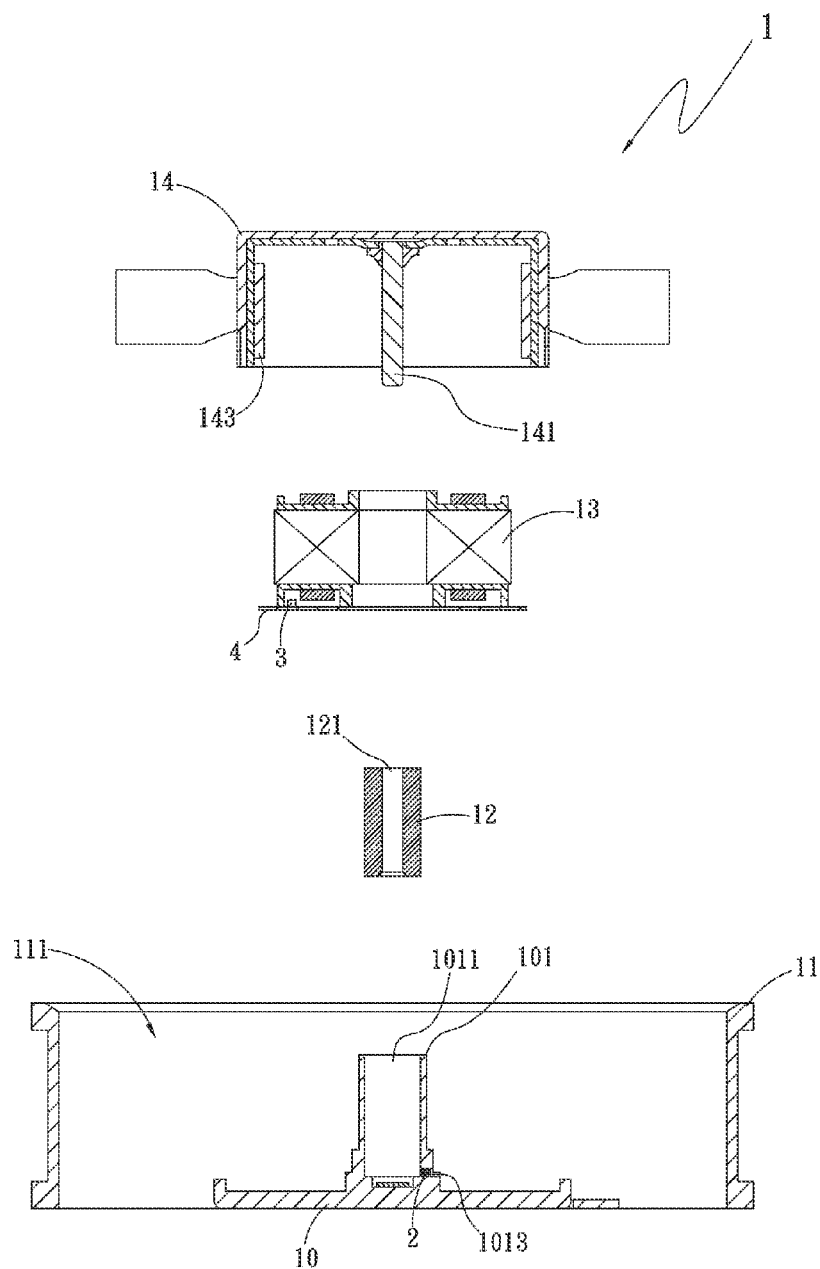
FIG. 3A is an exploded cross-sectional view according to the second preferred embodiment of the present invention.
Figure 3B:
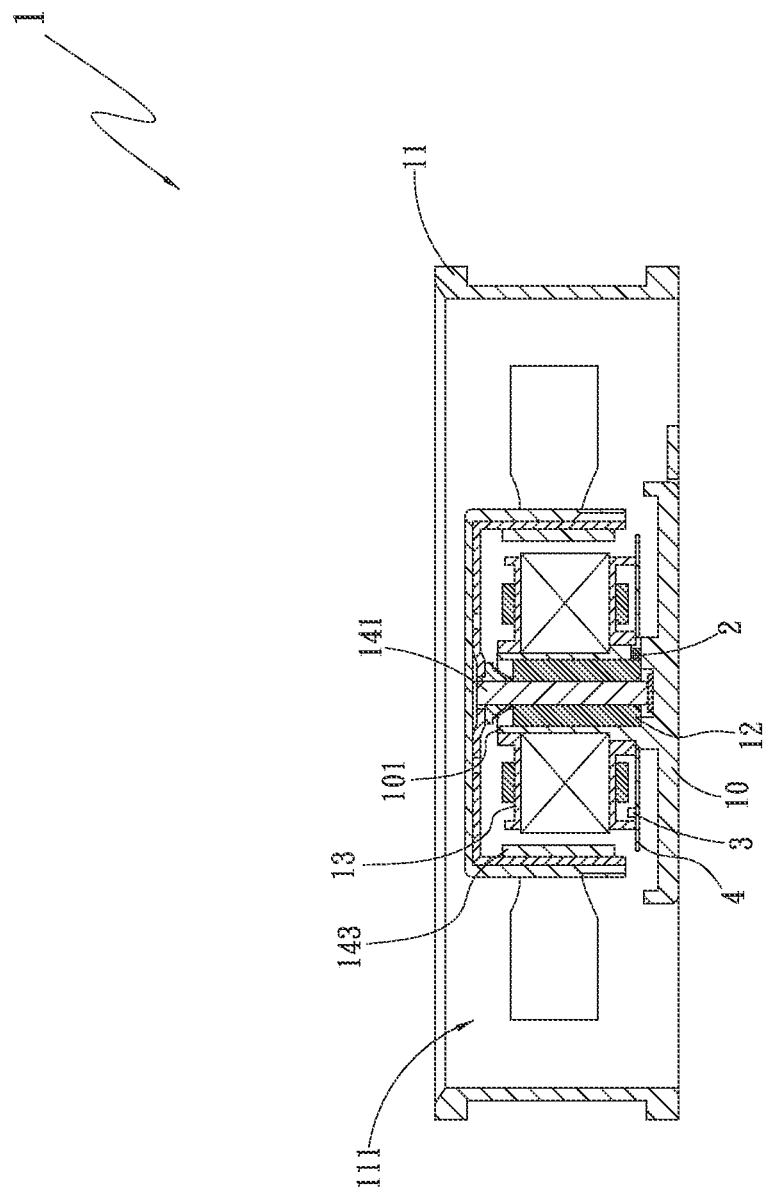
FIG. 3B is a combined cross-sectional view according to the second preferred embodiment of the present invention.

Please refer to FIGS. 3A and 3B, which show the exploded and combined cross-sectional views according to the second preferred embodiment of the present invention. Please also refer to FIG. 1. Some structures, connection relationship, and effects of the current embodiment are roughly the same as those of the above-mentioned first embodiment and will not be described again here. The main difference is that the sensing unit 2 disposed on the bearing 12 in the above-mentioned first embodiment is changed to be disposed on the bearing sleeve 101. That is, in the current embodiment the sensing unit 2 is disposed on the bearing sleeve 101 and at least one through hole 1013 is disposed on an outer side of the bearing sleeve 101, penetrates through the bearing sleeve 101 until a corresponding inner side thereof, corresponds to the bearing 12, and communicates with the bearing hole 1011. That is, the through hole 1013 is formed on the outer side of the bearing sleeve 101 by penetrating through the bearing sleeve 101 and communicates with the bearing hole 1011 in the bearing sleeve 101. The through hole 1013 corresponds to the bearing 12 in the bearing hole 1011.

Also, the above-mentioned through hole 1013 is used to accommodate the corresponding sensing unit 2 such that the sensing unit 2 disposed in the through hole 1013 senses (or monitors) the temperature of the bearing 12 to generate a temperature sensed signal and transmits it to the processing unit 3.

In the preferred embodiment, only one through hole 1013 penetrated through the bearing sleeve 101 is shown for explanation, but not limited to this. In the practice of the present invention, the user can design a number of through holes 1013 penetrated through the bearing sleeve 101 depending on the requirement of temperature accuracy to accommodate the corresponding sensing units 2 to sense the temperature of the bearing 12.

Figure 4A:
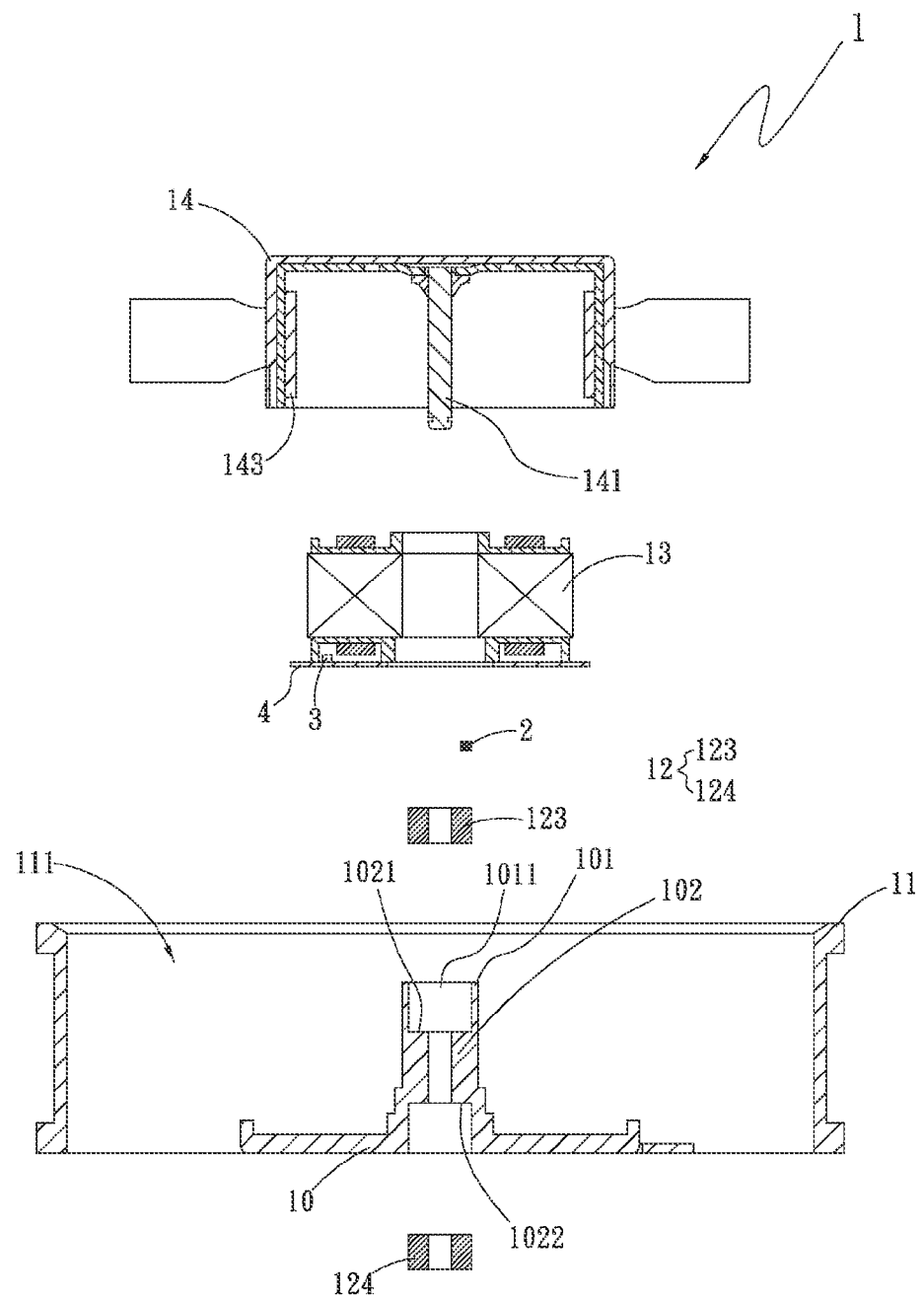
FIG. 4A is an exploded cross-sectional view according to the third preferred embodiment of the present invention.
Figure 4B:
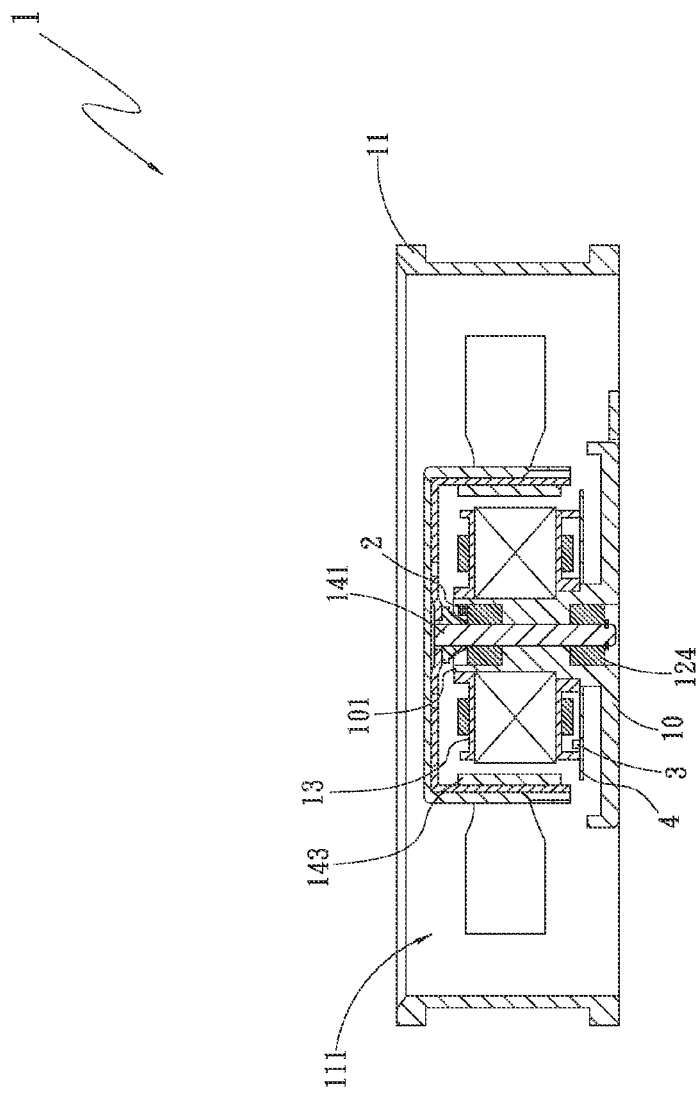
FIG. 4B is a combined cross-sectional view according to the third preferred embodiment of the present invention.

Please refer to FIGS. 4A and 4B, which show the exploded and combined cross-sectional views according to the third preferred embodiment of the present invention. Please also refer to FIG. 1. Some structures, connection relationship, and effects of the current embodiment are roughly the same as those of the above-mentioned first embodiment and will not be described again here. The difference between these two embodiments is that in the current embodiment a platform 102 is protruded from an inner side of the bearing sleeve 101, in which the platform 102 protrudes from the central portion of the inner side of the bearing sleeve 101 toward the center of the bearing hole 1011 and has a first end surface 1021 and a second end surface 1022 opposite to the first end surface 1021. The first end surface 1021 is adjacent to the free end (i.e., the end of the bearing sleeve 101 far away from the base 10) of the bearing sleeve 101 and the second end surface 1022 faces toward the base 10.

Further, the bearing 12 in the current preferred embodiment is a dual bearing (e.g., a ball bearing, porous bearing, roller bearing, or ceramic bearing) for explanation. That is, the bearing 12 has a first bearing 123 and a second bearing 124. The first bearing 123 is disposed on the first end surface 1021 and the sensing unit 2 is disposed on one side opposite to the first end surface 1021 such that the sensing unit 2 monitors the temperature of the first bearing 123 and the temperature of the second bearing 124 transmitted through the bearing sleeve 101 and the platform 102 to generate temperature sensed signals and then transmit them to the processing unit 3. The second bearing 124 is disposed on the second end surface 1022.

By means of sensing the temperatures of the first and second bearings 123, 124 in the bearing sleeve 101 through the sensing unit 2 of the present invention to generate the temperature sensed signals which are transmitted to the processing unit 3, the processing unit 3 performs the comparison of the received temperature sensed signals and the internal predetermined temperature value to generate the informing signal which is then transmitted to the electronic device 5 such that the user knows if the first and second bearings 123, 124 are abnormal and predicts the remaining lifetime of the first and second bearings 123, 124, whereby to achieve conveniences of operation and installation, and thus cost reduction.

Figure 5A:
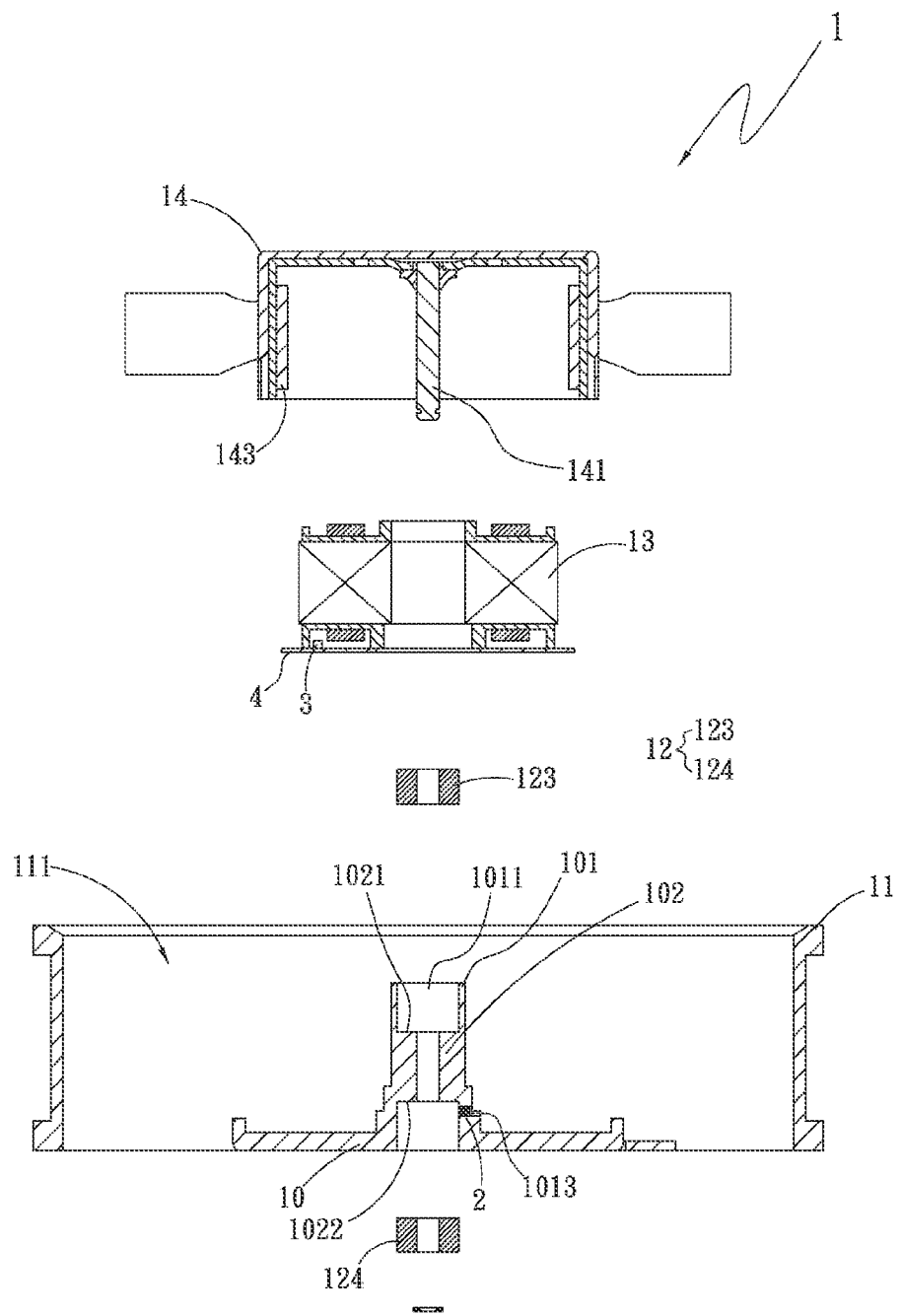
FIG. 5A is an exploded cross-sectional view according to the fourth preferred embodiment of the present invention.
Figure 5B:
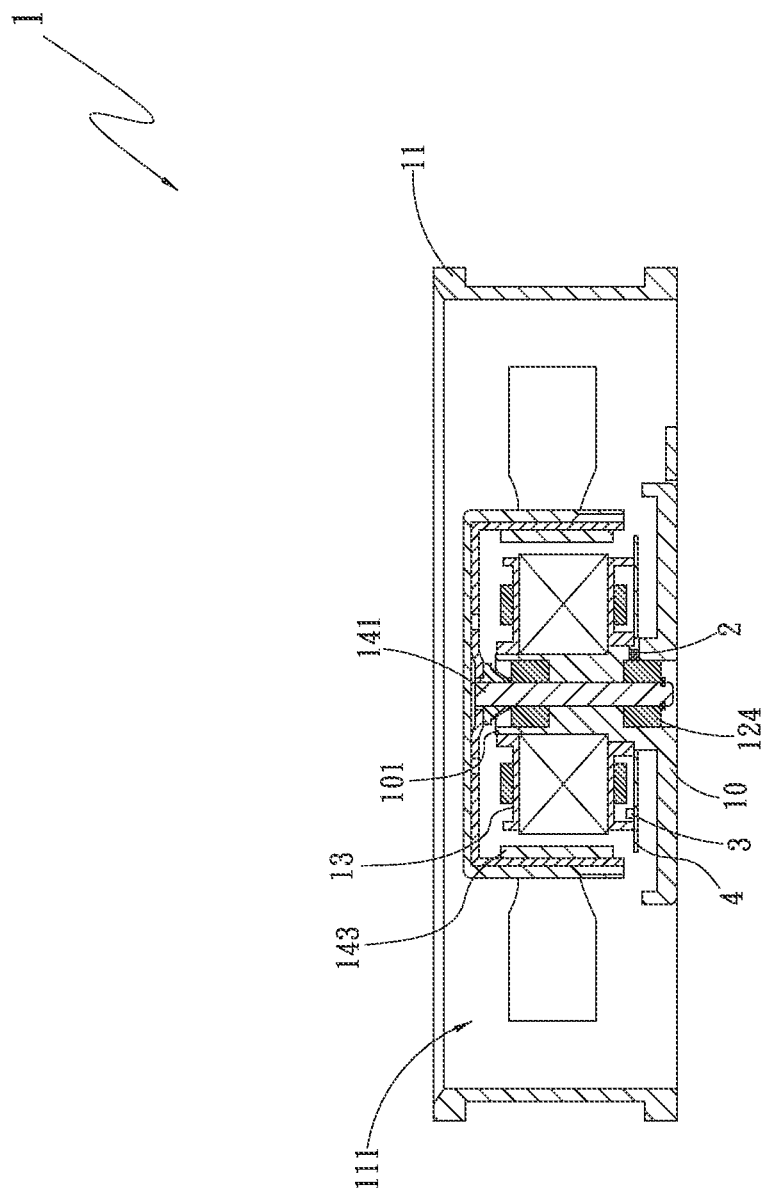
FIG. 5B is a combined cross-sectional view according to the fourth preferred embodiment of the present invention.

Please refer to FIGS. 5A and 5B, which show the exploded and combined cross-sectional views according to the fourth preferred embodiment of the present invention. Please also refer to FIG. 1. Some structures, connection relationship, and effects of the current embodiment are roughly the same as those of the above-mentioned third embodiment and will not be described again here. The main difference is that the sensing unit 2 disposed on the first bearing 123 in the above-mentioned third embodiment is changed to be disposed on the bearing sleeve 101. That is, in the current embodiment the sensing unit 2 is disposed on the bearing sleeve 101 and at least one through hole 1013 is disposed on an outer side of the bearing sleeve 101, penetrates through the bearing sleeve 101 until a corresponding inner side thereof, communicates with the bearing hole 1011, and corresponds to the second bearing 124. That is, the through hole 1013 is formed on the outer side of the bearing sleeve 101 by penetrating through the bearing sleeve 101 and communicates with the bearing hole 1011 in the bearing sleeve 101. The through hole 1013 corresponds to the second bearing 124 in the bearing hole 1011.

Also, the above-mentioned through hole 1013 is used to accommodate the corresponding sensing unit 2 such that the sensing unit 2 disposed in the through hole 1013 senses (or monitors) the temperature of the second bearing 124 and the temperature of the first bearing 123 transmitted through the bearing sleeve 101 and the platform 102 to generate temperature sensed signals and transmits them to the processing unit 3.

By means of the design of monitoring the temperatures of the first and second bearings 123, 124 through the sensing unit 2 of the present invention to generate the informing signals to warn (or inform) the user, it can effectively achieve the effects of monitoring the status of the bearings 12 and predicting the remaining lifetime of the bearings and further achieve conveniences of operation and installation, and thus cost reduction.

Figure 6A:
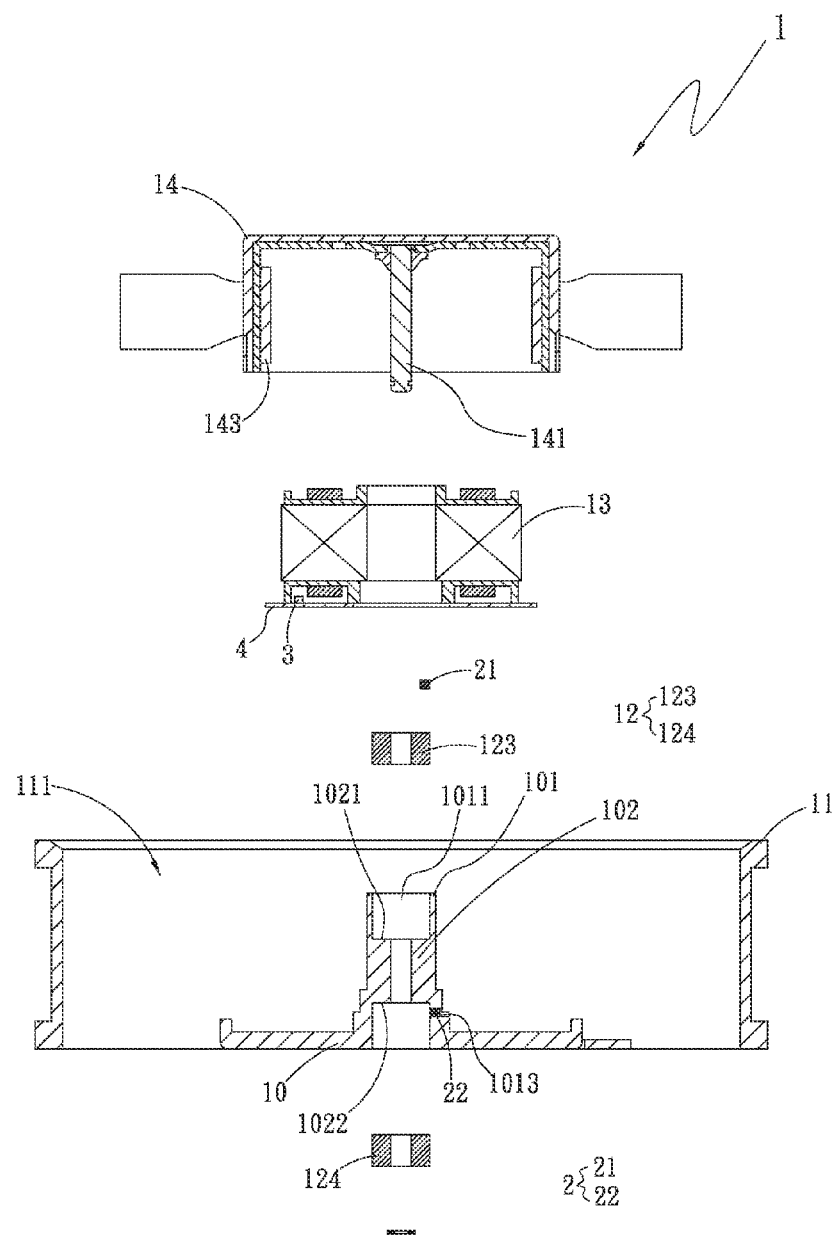
FIG. 6A is an exploded cross-sectional view according to the fifth preferred embodiment of the present invention.
Figure 6B:
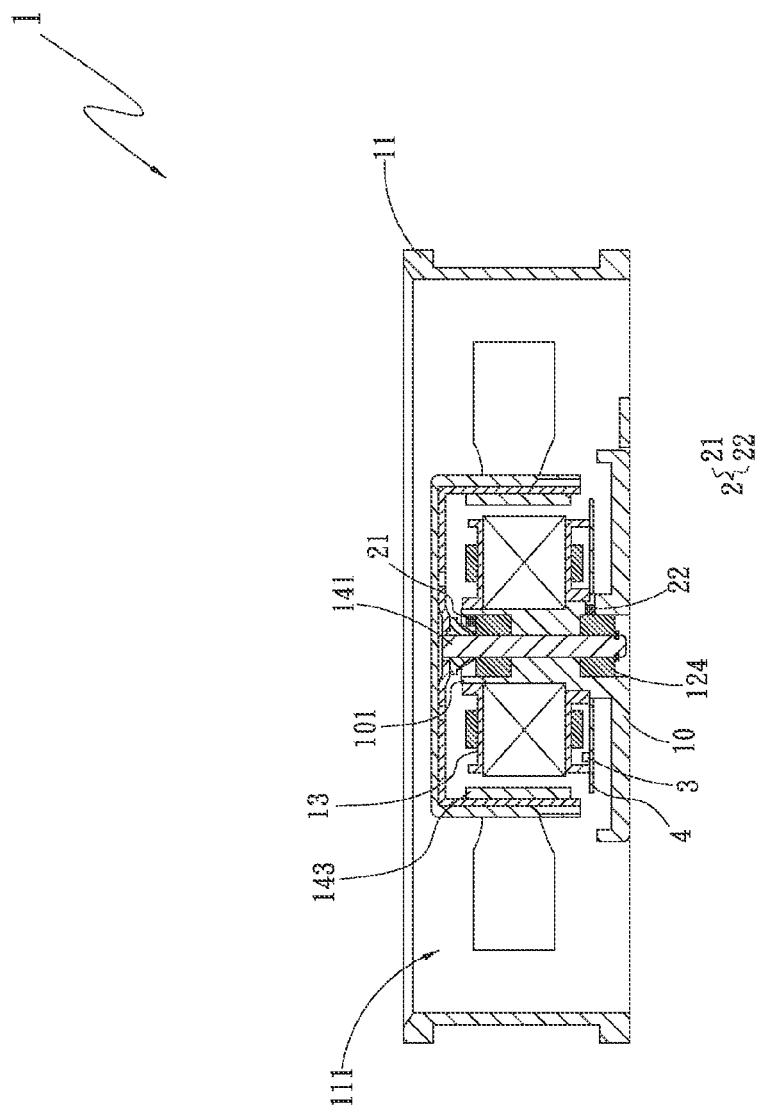
FIG. 6B is a combined cross-sectional view according to the fifth preferred embodiment of the present invention.

Please refer to FIGS. 6A and 6B, which show the exploded and combined cross-sectional views according to the fifth preferred embodiment of the present invention. Please also refer to FIG. 1. Some structures, connection relationship, and effects of the current embodiment are roughly the same as those of the above-mentioned third embodiment and will not be described again here. The main difference is that in the current embodiment the sensing unit 2 comprises a first temperature sensor 21 and a second temperature sensor 22. The first temperature sensor 21 is disposed on one side of the first bearing 123 opposite to the first end surface 1021 and is used to sense a temperature corresponding to the first bearing 123 to generate a first temperature sensed signal.

Also, the second temperature sensor 22 is disposed in a through hole 1013 which is disposed on the bearing sleeve 101 and penetrates from the outer side of the bearing sleeve 101 and through the bearing sleeve 101 until the inner side thereof. The through hole 1013 communicates with the bearing hole 1011 and corresponds to the second bearing 124. The second temperature sensor 22 is used to sense a temperature corresponding to the second bearing 124 to generate a second temperature sensed signal.

Then, the processing unit 3 generates an informing signal based on comparison of the received first and second temperature sensed signals and the internal predetermined temperature value, and then substitutes the compared result into the equation of calculating the bearing lifetime. Then the informing signal is transmitted to the electronic device 5 via the communication interface 41 such that the user knows the status of the first and second bearings 123, 124 (i.e., if the first and second bearings 123, 124 are abnormal) and predicts the lifetimes of the first and second bearings 123, 124 via the informing signal displayed by the electronic device 5. Therefore, the effects of effectively monitoring the status of the bearings 12 and predicting the remaining lifetime of the bearings 12 can be achieved. Further, cost reduction and convenient operation also can be fulfilled.

Compared to the prior art, the present invention has the following advantages.

1. Effects of monitoring the bearing status and predicting the remaining lifetime of the bearing.
2. Conveniences of operation and installation.
3. Cost reduction.

The above description is only about the preferred feasible embodiments of the present invention. It will be understood that all variations of the above methods, shapes, structures, and apparatus according to the present invention should be embraced by the scope of the appended claims of the present invention.

What is claimed is:

1. A device for monitoring a lifetime of fan bearings, which is applied to a fan, comprising:
   a base having a bearing sleeve having a bearing hole for receiving at least one bearing having a shaft hole, the bearing sleeve protruding from the center of the base;
   at least one sensing unit selectively disposed on the bearing sleeve or on the at least one bearing for sensing a temperature of the corresponding bearing to generate a temperature sensed signal;
   a processing unit electrically connected to the at least one sensing unit and generating an informing signal based on comparison of the received temperature sensed signal and an internal predetermined temperature value; and
   a control plate disposed on the base and being adjacent to the bearing sleeve, wherein the processing unit is disposed on one side of the control plate and is electrically connected to the control plate;
   wherein a silicon steel plate set is sleeved to the bearing sleeve and is electrically connected to the control plate, wherein the bearing sleeve is pivoted to a fan wheel having a shaft, wherein one end of the shaft is affixed to the fan wheel and the other end thereof is rotatably disposed in the corresponding shaft hole, wherein the fan wheel covers the silicon steel plate set; and
   wherein a communication interface is provided on the control plate, wherein the communication interface is connected to an electronic device, wherein the processing unit transmits the informing signal to the electronic device via the communication interface, such that a user can know the information if the bearing is abnormal or about the lifetime prediction of the bearing via the informing signal displayed by the electronic device.

2. The device according to claim 1, wherein the sensing unit is disposed on the bearing in the bearing sleeve to sense a temperature corresponding to the bearing and the generated temperature sensed signal is transmitted to the processing unit.

3. The device according to claim 1, wherein the at least one sensing unit is disposed on the bearing sleeve, wherein at least one through hole is disposed on an outer side of the bearing sleeve, penetrates through the bearing sleeve until a corresponding inner side thereof, communicates with the bearing hole, and corresponds to the bearing, wherein the through hole is used to accommodate the corresponding sensing unit.

4. The device according to claim 1, wherein a platform is protruded from an inner side of the bearing sleeve, wherein the platform protrudes from the central portion of the inner side of the bearing sleeve toward the center of the bearing hole and has a first end surface and a second end surface opposite to the first end surface, wherein the first end surface is adjacent to the free end of the bearing sleeve and the second end surface faces toward the base.

5. The device according to claim 4, wherein the at least one bearing has a first bearing and a second bearing, wherein the first bearing is disposed on the first end surface and the second bearing on the second end surface.

6. The device according to claim 5, wherein the at least one sensing unit is disposed on a side of the first bearing opposite to the first end surface and is used to sense a temperature corresponding to the first bearing and the generated temperature sensed signal is transmitted to the processing unit.

7. The device according to claim 5, wherein the at least one sensing unit is disposed on the bearing sleeve and at least one through hole is disposed on an outer side of the bearing sleeve, penetrates through the bearing sleeve until a corresponding inner side thereof, corresponds to the second bearing, and communicates with the bearing hole, wherein the through hole is used to accommodate the corresponding sensing unit.

8. The device according to claim 5, wherein the at least one sensing unit comprises a first temperature sensor and a second temperature sensor, wherein the first temperature sensor is disposed on one side of the first bearing opposite to the first end surface and is used to sense a temperature corresponding to the first bearing to generate a first temperature sensed signal, wherein the second temperature sensor is disposed in a through hole which is disposed on the bearing sleeve, corresponds to the second bearing and communicates with the bearing hole, wherein the second temperature sensor is used to sense a temperature corresponding to the second bearing to generate a second temperature sensed signal, wherein the processing unit receives the first and the second temperature sensed signals.

9. The device according to claim 1, wherein the processing unit is a microprocessor and the sensing unit is a temperature sensor.

10. The device according to claim 1, wherein the connection between the communication interface and the electronic device is selectively wired or wireless.

\* \* \* \* \*